United States Patent
Pearson

(10) Patent No.: US 7,104,385 B2
(45) Date of Patent: Sep. 12, 2006

(54) RAILROAD HOPPER CAR UNLOADER

(76) Inventor: William R. Pearson, 22988 W. Toledo St., Curtice, OH (US) 43412

( * ) Notice: Subject to any disclaimer, the term of this patent is extended or adjusted under 35 U.S.C. 154(b) by 0 days.

(21) Appl. No.: 10/333,507

(22) PCT Filed: Jul. 20, 2001

(86) PCT No.: PCT/US01/22941

§ 371 (c)(1),
(2), (4) Date: Jan. 20, 2003

(87) PCT Pub. No.: WO02/079016

PCT Pub. Date: Oct. 10, 2002

(65) Prior Publication Data

US 2003/0206776 A1 Nov. 6, 2003

Related U.S. Application Data

(60) Provisional application No. 60/220,095, filed on Jul. 21, 2000.

(51) Int. Cl.
*B65G 53/24* (2006.01)
(52) U.S. Cl. ................... 198/145; 406/151
(58) Field of Classification Search ............... 406/145, 406/151
See application file for complete search history.

(56) References Cited

U.S. PATENT DOCUMENTS

| | | | | |
|---|---|---|---|---|
| 3,694,037 A | * | 9/1972 | Feder | ............ 406/23 |
| 3,709,562 A | * | 1/1973 | Feder | ............ 406/109 |
| 4,189,262 A | | 2/1980 | Anderson | |
| 4,353,668 A | * | 10/1982 | Anderson | ............ 406/90 |
| 4,411,560 A | | 10/1983 | McComb | |
| 4,412,762 A | | 11/1983 | Lepley | |
| 4,586,852 A | * | 5/1986 | Oda et al. | ............ 406/14 |
| 4,819,830 A | | 4/1989 | Schultz | |
| 4,830,546 A | * | 5/1989 | Witham et al. | ............ 406/41 |
| 4,867,073 A | | 9/1989 | Dugge | |
| 4,867,615 A | | 9/1989 | Fritz | |
| 4,902,173 A | * | 2/1990 | Hendee et al. | ............ 406/145 |
| 5,188,264 A | | 2/1993 | Parkow | |
| 5,433,559 A | | 7/1995 | Vande Sande | |
| 5,492,144 A | | 2/1996 | Kriewaldt | |
| 5,618,136 A | * | 4/1997 | Smoot | ............ 406/93 |
| 5,794,539 A | | 8/1998 | Ott | |
| 5,971,207 A | * | 10/1999 | McDonough et al. | ............ 222/1 |
| 6,264,064 B1 | * | 7/2001 | Birtcher et al. | ............ 222/1 |
| 6,890,129 B1 | * | 5/2005 | Fabbri | ............ 406/106 |

* cited by examiner

*Primary Examiner*—Joe Dillon, Jr.
(74) *Attorney, Agent, or Firm*—MacMillan, Sobanski & Todd, LLC

(57) ABSTRACT

A system unloads material, such as bulk quantities of dry product, from a container, such as a railroad hopper car, in a fast and efficient manner. The container defines an interior adapted to contain a product and includes a product discharge section adapted to allow the product to pass therethrough. The material unloading system includes a product outlet line adapted to communicate with the product discharge section. The product outlet line includes a product outlet adapted to allow the product to pass therethrough. A source of pressurized fluid communicates with the product outlet line and is adapted to move product from the product discharge section to the product outlet. A source of vacuum communicates with the product outlet and is adapted to unload the product from the product outlet.

6 Claims, 4 Drawing Sheets

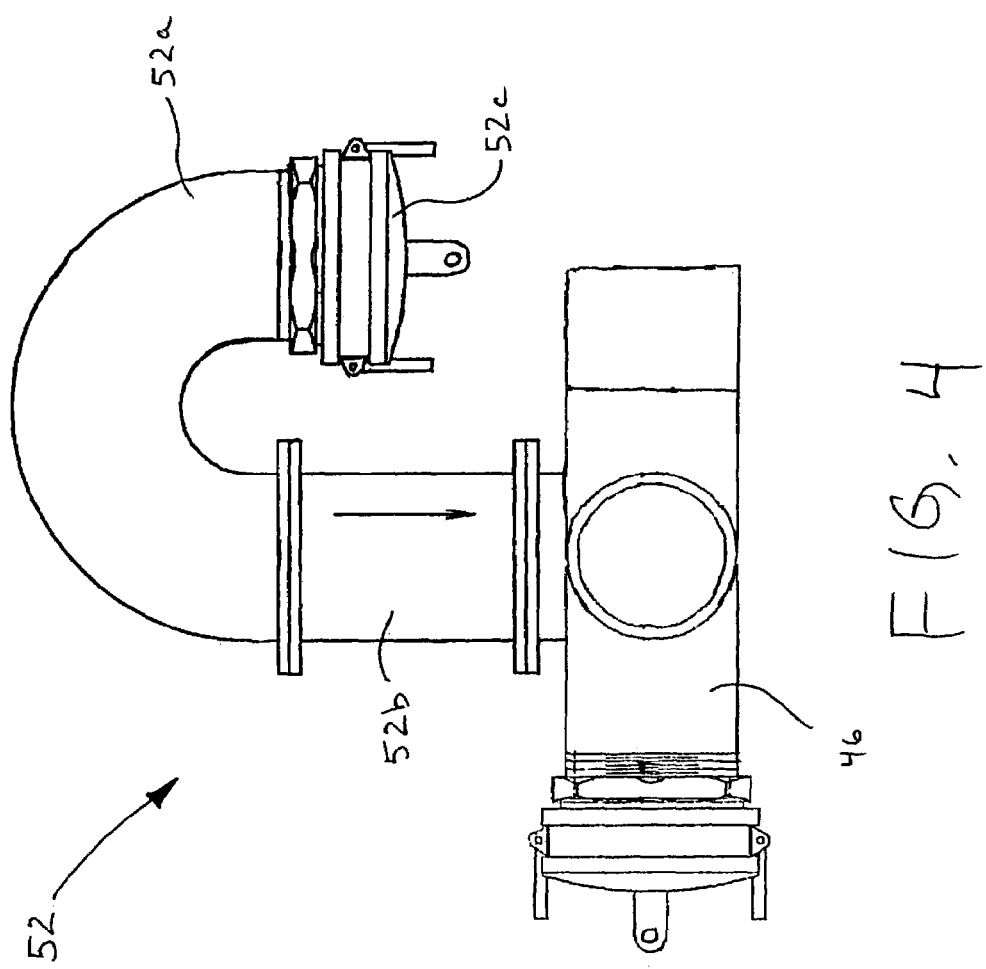

RAILROAD HOPPER CAR UNLOADER

CROSS REFERENCE TO RELATED APPLICATION

This application claims the benefit of U.S. Provisional Application No. 60/220,095, filed Jul. 21, 2000.

BACKGROUND OF THE INVENTION

This invention relates to an improved structure for unloading bulk quantities of dry product from a railroad hopper car in a fast and efficient manner.

Railroad hopper cars are well known in the art and are commonly used to transport bulk quantities of dry product from one location to another. A typical railroad hopper car includes a sealed container that is supported on a pair of spaced apart wheel assemblies. The container has upper surface that is usually provided with a plurality of spaced apart hatches to facilitate the loading of the product into the container. The lower portion of the container is often segmented into a plurality of tapered discharge sections to facilitate the unloading of the product therefrom.

In some instances, the unloading of the railroad hopper cars occurs solely under the influence of gravity. To accomplish this, a valve provided on the bottom of the tapered discharge section of the container is opened, allowing the product to flow downwardly therethrough into a receiving apparatus. Such gravity unloading is simple and inexpensive from an equipment standpoint, but has been found to be rather inefficient. This is because the product unloads from the container at a relatively slow rate, which undesirably increases the amount of time and resources required to empty the product from the container. Also, portions of the product often coalesce and adhere to the interior of the container. When this occurs, portions of the product do not unload under the sole influence of gravity, thus requiring additional time and effort to dislodge such portions for unloading.

To address these problems, some railroad hopper cars are provided with equipment that introduces pressurized air within the container during the unloading process. The introduction of pressurized air within the container increases the magnitude of the air pressure therein, thus positively urging the product out of the container at a rate that is faster than if the product was unloaded solely under the influence of gravity. Additionally, the flow of pressurized air within the container tends to stir up or fluidize the product therein so as to minimize the occurrence of coalescence and adherence of the product to the interior of the container. Thus, the benefits of pressure differential unloading have been found to outweigh the additional costs associated with the additional equipment that is necessary to perform it.

Although railroad hopper cars provided with this pressure differential equipment have functioned successfully for many years, the occurrence of coalescence and adherence of the product to the interior of the container remains a concern. Furthermore, it would be desirable to provide a structure for unloading product from a is railroad hopper car that is even faster than known pressure differential unloading techniques.

SUMMARY OF THE INVENTION

This invention relates to an improved structure for a system for unloading material, such as bulk quantities of dry product, from a container, such as a railroad hopper car, in a fast and efficient manner. The container defines an interior adapted to contain a product and includes a product discharge section adapted to allow the product to pass therethrough. The material unloading system includes a product outlet line adapted to communicate with the product discharge section. The product outlet line includes a product outlet adapted to allow the product to pass therethrough. A source of pressurized fluid communicates with the product outlet line and is adapted to move product from the product discharge section to the product outlet. A source of vacuum communicates with the product outlet and is adapted to unload the product from the product outlet.

Various objects and advantages of this invention will become apparent to those skilled in the art from the following detailed description of the preferred embodiment, when read in light of the accompanying drawings.

BRIEF DESCRIPTION OF THE DRAWINGS

FIG. 4 is an enlarged side elevational view of the venturi valve assembly illustrated in FIG. 2.

DETAILED DESCRIPTION OF THE PREFERRED EMBODIMENT

Figure 1:
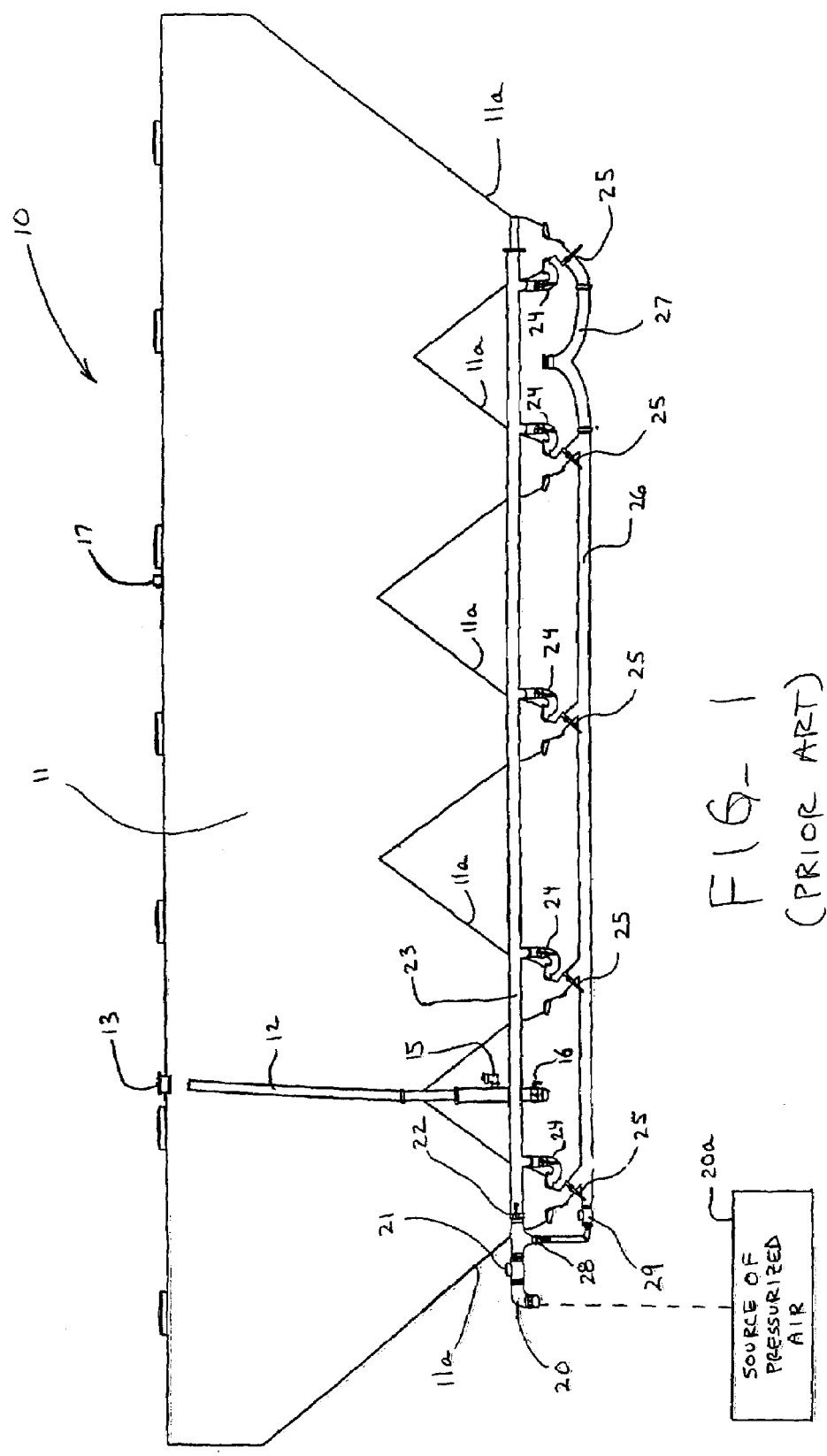
FIG. 1 is a schematic side elevational view of a portion of a conventional pressure differential railroad hopper car.

Referring now to the drawings, there is schematically illustrated in FIG. 1 a portion of a pressure differential railroad hopper car, indicated generally at 10, that is conventional in the art. The illustrated railroad hopper car 10 includes a sealed container 11 that is adapted to be filled with a bulk quantity of a material, such as flour or other dry particulate materials, for example. The lower portion of the container 11 is segmented into a plurality (five, for example, as shown) of product discharge sections 11a. The container 11 can be supported on a pair of spaced apart wheel assemblies (not shown) for facilitating transportation of the railroad hopper car 10 and the material contained therein from one location to another along a railroad line. A standpipe 12 is provided on the container 11 of the railroad hopper car 10. The standpipe 12 is a hollow tubular member having an upper end that extends within the interior of the container 11 and a lower end that extends out of and below the container 11. A cap 13 is provided in the upper surface of the container 13 adjacent to the upper end of the standpipe 12. The cap 13 is removable to provide access to the interior of the container 11 for inspection and cleaning purposes, particularly for cleaning the standpipe 12 when it has become clogged. The lower end of the standpipe 12 has a primary pressure relief valve 15 provided thereon for a purpose that will be explained below. The lower end of the standpipe 12 selectively communicates through a blowdown valve 16 with the atmosphere. A secondary pressure relief valve 17 can be provided on the upper surface of the container 11 for a purpose that will also be explained below.

The railroad hopper car 10 also includes a material unloading system that includes an air inlet 20 that is adapted to be connected to a source of pressurized air 20a, such as a motor driven blower (not shown). The air inlet 20 may be provided with a dust cap or other protective cover structure (not shown) when not in use. The air inlet 20 communicates through a check valve 21 with a main aerator valve 22. The check valve 21 permits the one-way flow of air from the air inlet 20 to the main aerator valve 22. The main aerator valve 22 provides selective communication with a main aerator line 23 that extends along most of the length of the railroad hopper car 10. When the main aerator valve 22 is opened, pressurized air from the source of pressurized air 20a can flow therethrough into the main aerator line 23. When the main aerator valve 22 is closed, pressurized air from the source of pressurized air 20a is prevented from flowing therethrough into the main aerator line 23.

The main aerator line 23 selectively communicates through a plurality of individual aerator valves 24 with each of the discharge sections 11a of the container 11. When the individual aerator valves 24 are opened, pressurized air from the main aerator line 23 can flow therethrough into respective aerators (not shown) provided within each of the associated discharge sections 11a of the container 11. When the individual aerator valves 24 are closed, pressurized air from the main aerator line 23 is prevented from flowing therethrough into the associated discharge sections 11a of the container 11.

Each of the discharge sections 11a of the container 11 selectively communicates through a plurality of individual product discharge valves 25 with a product discharge line 26 that extends along most of the length of the railroad hopper car 10. When the individual product discharge valves 25 are opened, product contained within the associated discharge sections 11a of the container 11 can flow therethrough into the product discharge line 26. When the individual product discharge valves 25 are closed, product contained within the associated discharge sections 11a of the container 11 is prevented from flowing therethrough into the product discharge line 26. The product discharge line 26 communicates with a product outlet 27 that allows product to flow therethrough out from the railroad hopper car 10, such as into an external storage facility or another transportation vehicle (not shown). The product outlet 27 is shown in FIG. 1 in an upwardly facing position, where it is usually maintained for transport. However, the product outlet 27 can be rotated relative to the product discharge line 26 to a sideways or downwardly facing position to unload product from the container 11. To further facilitate the flow of the product through the product discharge line 26, the air inlet 20 also communicates through the check valve 21 with a pressure control valve 28 and a check valve 29 with the product discharge line 26. In the manner described below, this provides additional air flow through the product discharge line 26 to facilitate the movement of the product therethrough.

The operation of the material unloading assembly of the railroad hopper car 10 will now be described. Initially, the blowdown valve 16, the main aerator valve 22, and all of the individual aerator valves 24 are opened, while each of the individual product discharge valves 25 and the pressure control valve 28 are closed. Then, the source of pressurized air 20a is activated to cause pressurized air to flow through the air inlet 20, the check valve 21, and the main aerator valve 22 into the main aerator line 23 and each of the discharge sections 11a of the container 11. Initially, some flow of air should be detected from the lower end of the standpipe 12. If such airflow occurs, then it can be assumed that the standpipe 12 is not undesirably clogged with product. Accordingly, the blowdown valve 16 can then be closed. However, if no airflow occurs from the lower end of the standpipe 12, then it can be assumed that the standpipe 12 is undesirably clogged with product. In this instance, the source of pressurized air 20a should be shut down, and the cap 13 can be removed to facilitate cleaning of the standpipe 12.

Assuming that the standpipe 12 is not clogged, then the blowdown valve 16 is closed. The pressurized air that flows into the discharge sections 11a of the container 11 fluidizes the product located in the vicinity of the individual product discharge valves 25 of the discharge sections 11a. At the same time, the flow of such pressurized air causes the magnitude of the air pressure within the container 11 to increase. A gauge (not shown) is usually provided on the exterior of the container 11 to monitor the magnitude of the air pressure therein. Typically, the air pressure in the container 11 is increased to a relatively high level, such as approximately fourteen p.s.i., for example. The primary pressure relief valve 15 provided on the standpipe 12 and secondary pressure relief valve 17 provided on the container 11 prevent the magnitude of such increased pressure from exceeding a predetermined maximum value.

When the magnitude of the air pressure within the container 11 reaches a desired value, the pressure control valve 28 is then opened. As a result, some of the pressurized from the source 20a flows through the pressure control valve 28 into the product discharge line 26 and out through the product outlet 27. Consequently, the magnitude of the air pressure within the container 11 can be maintained at or near a desired value. When it is desired to unload material from the container 11, one of the individual product discharge valves 25 is opened, while the other individual product discharge valves 25 are left closed. As a result, product contained within the associated discharge section 11a of the container 11 can flow through the opened individual product discharge valve 25 into the product discharge line 26. The flow of product through the product discharge line 26 is facilitated by the flow of air from the air inlet 20 through the check valve 21 and the pressure control valve 28 into the product discharge line 26. The pressure control valve 28 can be used to regulate the amount of pressurized air that flows into the product discharge line 26. When the discharge section 11a associated with the opened individual product discharge valve 25 is empty, that individual product discharge valve 25 is closed, and the process is repeated for the next individual product discharge valve 25 and associated discharge section 11a.

Figure 2:
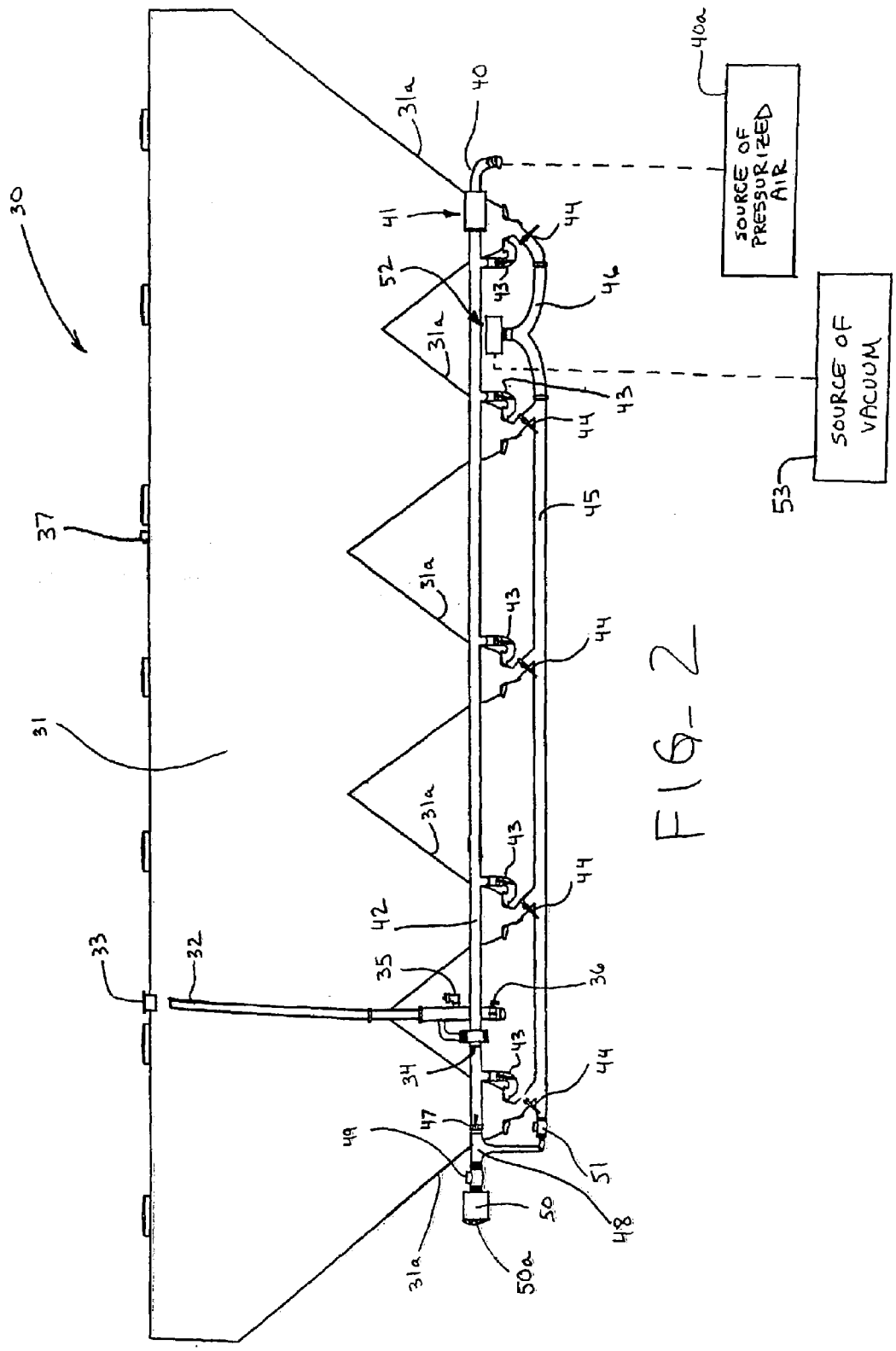
FIG. 2 is a schematic side elevational view of a portion of a pressure differential railroad hopper car in accordance with this invention.

Referring now to FIG. 2, there is schematically illustrated a portion of a pressure differential railroad hopper car, indicated generally at 30, that is conventional in the art. The illustrated railroad hopper car 30 includes a sealed container 31 that is adapted to be filled with a bulk quantity of a material, such as flour or other dry particulate materials, for example. The lower portion of the container 31 can be segmented into a plurality (five, for example, as shown) of product discharge sections 31a, although such is not necessary. The container 31 can be supported on a pair of spaced apart wheel assemblies (not shown) for facilitating transportation of the railroad hopper car 30 and the material contained therein from one location to another along a railroad line. Although this invention will be described in the context of the illustrated wheeled railroad hopper car 30, it will be appreciated that this invention may be used to unload a product from any type of containing structure, regardless of whether it is provided with wheels or other structures for facilitating transportation from one location to another.

A standpipe 32 is provided on the container 31 of the railroad hopper car 30. The standpipe 32 is a hollow tubular member having an upper end that extends within the interior of the container 31 and a lower end that extends out of and below the container 31. A cap 33 is provided in the upper surface of the container 33 adjacent to the upper end of the standpipe 32. The cap 33 is removable to provide access to the interior of the container 31 for inspection and cleaning purposes, particularly for cleaning the standpipe 32 when it has become clogged. The lower end of the standpipe 32 has a vacuum relief valve 34 and a primary pressure relief valve 35 provided thereon for purposes that will be explained below. The lower end of the standpipe 32 selectively communicates through a blowdown valve 36 with the atmosphere. A secondary pressure relief valve 37 can be provided on the upper surface of the container 31 for a purpose that will also be explained below. If desired, the vacuum relief valve 34 can be provided on the upper surface of the container 31 in lieu or, or in addition to, the vacuum relief valve 34 provided on the standpipe 32.

Figure 3:
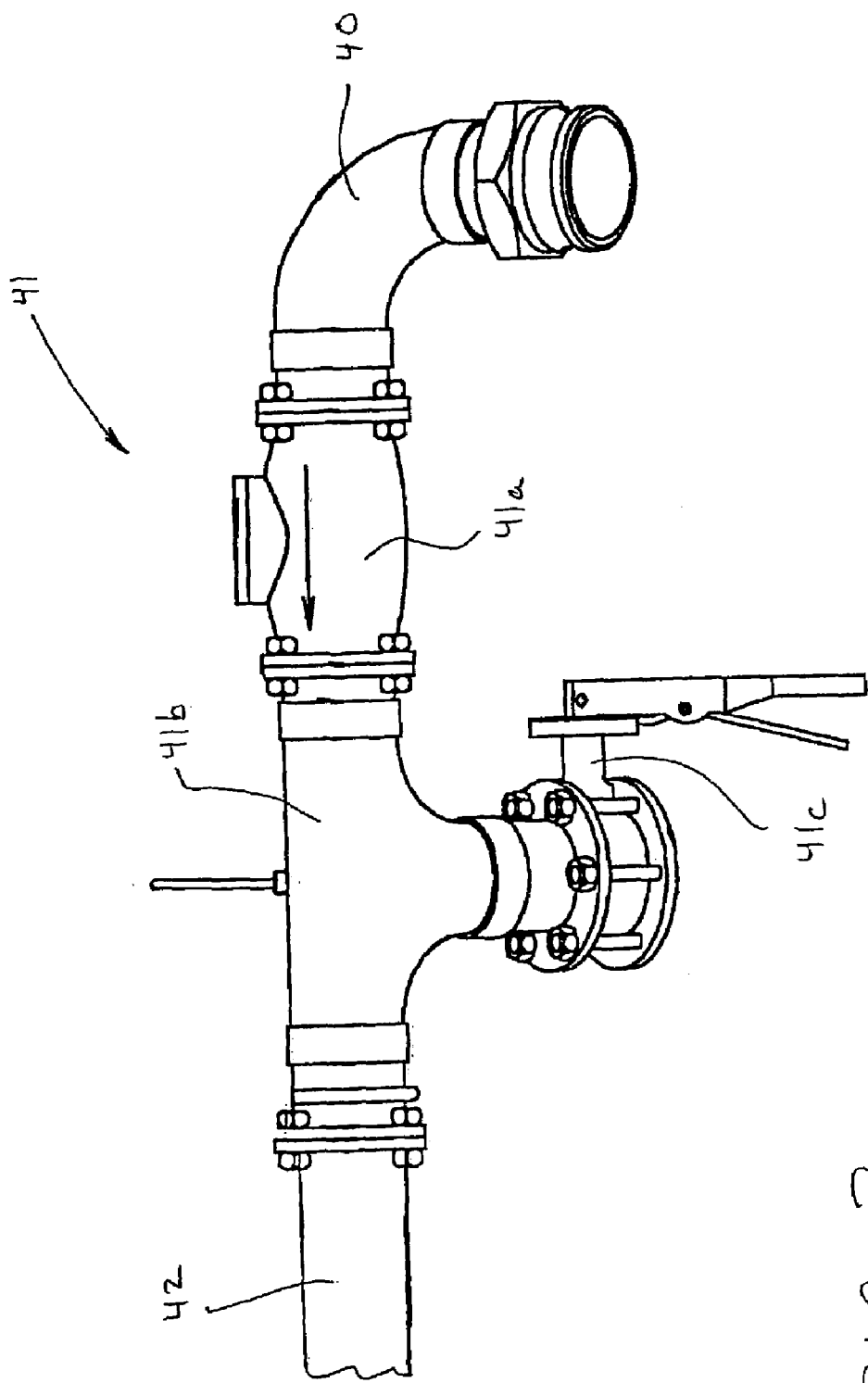
FIG. 3 is an enlarged side elevational view of the air inlet valve assembly illustrated in FIG. 2.

The railroad hopper car 30 also includes a material unloading material unloading system that includes a pressurized air inlet 40 that is adapted to be connected to a source of pressurized air (or other fluid) 40a, such as a motor driven blower (not shown). The pressurized air inlet 40 may be provided with a dust cap or other protective cover structure (not shown) when not in use. The pressurized air inlet 40 communicates with an air inlet valve assembly, indicated generally at 41. The structure of the air inlet valve assembly 41 is illustrated in detail in FIG. 3. As shown therein, the air inlet valve assembly 41 includes a check valve 41a that provides for the one-way flow of air from the air inlet 40 to one end of a T-fitting 41b. The other end of the T-fitting 41b is connected to a main aerator line 42 that extends through most of the length of the railroad hopper car 30. The branch portion of the T-fitting 41b selectively communicates through a pressure reducing valve 41c with the atmosphere. When the pressure reducing valve 41c is opened, air can flow from the check valve 41a to the atmosphere. When the pressure reducing valve 41c is closed, air is prevented from flowing from the check valve 41a to the atmosphere. The purpose for the pressure reducing valve 41c will be explained below.

The main aerator line 42 selectively communicates through a plurality of individual aerator valves 43 with each of the discharge sections 31a of the container 31. When the individual aerator valves 43 are opened, pressurized air from the main aerator line 42 can flow therethrough into respective aerators (not shown) provided within each of the associated discharge sections 31a of the container 31. When the individual aerator valves 43 are closed, pressurized air from the main aerator line 42 is prevented from flowing therethrough into the associated discharge sections 31a of the container 31.

Each of the discharge sections 31a of the container 31 selectively communicates through a plurality of individual product discharge valves 44 with a product discharge line 45 that extends along most of the length of the railroad hopper car 30. When the individual product discharge valves 44 are opened, product contained within the associated discharge sections 31a of the container 31 can flow therethrough into the product discharge line 45. When the individual product discharge valves 44 are closed, product contained within the associated discharge sections 31a of the container 31 is prevented from flowing therethrough into the product discharge line 45. The product discharge line 45 communicates with a product outlet 46 that allows product to flow therethrough out from the railroad hopper car 30, such as into an external storage facility or another transportation vehicle (not shown). The product outlet 46 is shown in FIG. 2 in an upwardly facing position, where it is usually maintained for transport. However, the product outlet 46 can be rotated relative to the product discharge line 45 to a sideways or downwardly facing position to unload product from the container 31.

The main aerator line 42 selectively communicates through a pressure control valve 47 with one end of a T-fitting 48. The other end of the T-fitting 48 communicates through a check valve 49 with an air inlet 50. The air inlet 50 may be embodied as a hollow cylindrical or tapered member having a screen 50a or similar device for restricting the passage of airborne articles therethrough. The check valve 49 permits the one-way flow of air from the air inlet 50 to the T-fitting 48. The branch of the T-fitting 48 communicates through a check valve 51 with the product outlet line 45. The check valve 51 permits the one-way flow of air from the T-fitting 48 to the product outlet line 45.

A venturi valve assembly, indicated generally at 52, is connected between the product outlet 46 and a source of vacuum 53. The structure of the venturi valve assembly 52 is shown in detail in FIG. 4. As shown therein, the venturi valve assembly 52 includes a venturi pipe 52a that communicates through a check valve 52b with the product outlet 46. The check valve 52b permits the one-way flow of air from the venturi pipe 52a to the product outlet 46. The venturi pipe 52a may be provided with a dust cap or other protective cover structure 52c when not in use. The purpose for the venturi valve assembly 52 will be explained below.

The operation of the material unloading assembly of the railroad hopper car 30 will now be described. Initially, the blowdown valve 36 and all of the individual aerator valves 43 are opened, while the pressure reducing valve 41a of the air inlet valve assembly 41, each of the individual product discharge valves 44, and the pressure control valve 47 are closed. Then, the source of pressurized air 40a is activated to cause pressurized air to flow through the check valve 41a and the T-fitting 41b of the air inlet valve assembly 41 into the main aerator line 42 and each of the discharge sections 31a of the container 31. Initially, some flow of air should be detected from the lower end of the standpipe 32. If such airflow occurs, then it can be assumed that the standpipe 32 is not undesirably clogged with product. Accordingly, the blowdown valve 36 can then be closed. However, if no airflow occurs from the lower end of the standpipe 32, then it can be assumed that the standpipe 32 is undesirably clogged with product. In this instance, the source of pressurized air 40a should be shut down, and the cap 33 can be removed to facilitate cleaning of the standpipe 32.

Assuming that the standpipe 32 is not clogged, then the blowdown valve 36 is closed. The pressurized air that flows into the discharge sections 31a of the container 31 fluidizes the product located in the vicinity of the individual product discharge valves 44 of the discharge sections 31a. At the same time, the flow of such pressurized air causes the magnitude of the air pressure within the container 31 to increase. A gauge (not shown) is usually provided on the exterior of the container 31 to monitor the magnitude of the air pressure therein. Unlike the conventional embodiment described above, the air pressure in the container 31 is increased to a relatively low level, such as approximately two to three p.s.i., for example. The primary pressure relief valve 35 provided on the standpipe 32 and secondary pressure relief valve 37 provided on the container 31 prevent the magnitude of such increased pressure from exceeding a predetermined maximum value.

At the same time that the source of pressurized air 40a is activated, the source of vacuum 53 can be activated as well to evacuate the product discharge line 45 through the venturi valve assembly 52. When this occurs, air from the atmosphere is drawn in through the air inlet 50 and the check valve 51 to the product discharge line 45. However, because all of the individual product discharge valves 44 are closed, no product is moved through the product discharge line 45.

When the magnitude of the air pressure within the container 31 reaches a desired value, the pressure control valve 47 is then opened. For reasons that will be explained below, the pressure control valve 47 is preferably opened only partially to a relatively small amount of the pressurized air in the main aerator line 42 to flow through the T-fitting 48 and the check valve 51 into the product discharge line 45. Thus, some of the pressurized from the source 40a flows through the product discharge line 45 and out through the product outlet 46 and the venturi valve assembly 52. Consequently, the magnitude of the air pressure within the container 31 can be maintained at or near a desired value. If necessary, the magnitude of the air pressure within the container 31 can also be adjusted by selectively opening the pressure reducing valve 41c of the air inlet valve assembly 41.

When it is desired to unload material from the container 31, one of the individual product discharge valves 44 is opened, while the other individual product discharge valves 44 are left closed. As a result, product contained within the associated discharge section 31a of the container 31 can flow through the opened individual product discharge valve 44 into the product discharge line 45. The pressurized air generated by the source 40a functions to accomplish two objectives. First, some of the pressurized air generated by the source 40a is supplied through the individual aerator valves 43 to the interior of the container 31 for the purpose of fluidizing the product located in the vicinity of the individual product discharge valves 44 of the discharge sections 31a. This facilitates the flow of product through the opened individual product discharge valve 44 and minimizes the occurrence of coalescence and adherence of the product to the interior of the container 31.

Second, some of the pressurized air generated by the source 40a is supplied through the pressure control valve 47, the T-fitting 48, and the check valve 51 to the product discharge line 45 for the purpose of moving the product through the product discharge line 45 to the product outlet 46 (the check valve 49 prevents such pressurized air from escaping through the air inlet 50). The magnitude of the pressurized air generated by the source 40a need only be relatively small (two to three p.s.i., for example, as mentioned above) to accomplish both of these purposes. Once the product has been moved to the product outlet 46, the vacuum generated by the source 53 draws the product therefrom. The venturi valve assembly 52 allows air from the atmosphere to be drawn therein to be mixed with the product to facilitate the flow of the product outwardly from the product outlet 46. When the discharge section 31a associated with the opened individual product discharge valve 44 is empty, that individual product discharge valve 44 is closed, and the process is repeated for the next individual product discharge valve 44 and associated discharge section 31a.

The magnitude of the pressurized air generated by the source 40a and the magnitude of the vacuum generated by the source 53 often varies from location to location when unloading the railroad hopper car 30. Typically, one or more gauges (not shown) are provided at the unloading location for allowing the unloading of the product to occur at a rate that is optimal with the magnitude of the pressurized air generated by the source 40a and the magnitude of the vacuum generated by the source 53. The pressure reducing valve 41c of the air inlet valve assembly 41 and the pressure control valve 47 can be adjusted during the unloading process to accommodate these varying pressurized air and vacuum conditions. Also, during the unloading process, it may be desirable to vary the magnitude of the pressurized air generated by the source 40a and the magnitude of the vacuum generated by the source 53. For example, the farther the individual product discharge valve 44 is located from the product outlet 46, the greater amount of pressurized air will be required to move the product through the product outlet line 45. Thus, adjustment of the various valves discussed above may be desirable to maintain optimum flow of product.

As mentioned above, the vacuum relief valve 34 is provided on the lower end of the standpipe 32. The vacuum relief valve 34 is provided to allow air to be drawn within the interior of the container 31 if, for some reason, the magnitude of the air pressure therein drops below a predetermined amount. Typically, the container 31 is designed to withstand relatively high pressures therein, such as the approximately fourteen p.s.i. discussed above in connection with the conventional container 11. However, such containers 31 are not usually designed to withstand negative pressures of significant magnitude. Such a negative pressure situation could occur if, for example, the person operating the material unloading system improperly adjusted the positions of the various valves discussed above. In that instance, the vacuum relief valve 34 would allow air to be drawn within the interior of the container 31 and prevent the magnitude of the air pressure therein from dropping below a predetermined amount.

It will be appreciated that the material unloading system of this invention is readily retrofit onto an otherwise conventional pressure differential railroad hopper car. If desired, the railroad hopper car 30 of this invention can be unloaded using the same pressure differential method described above in connection with the conventional railroad hopper car 10. Thus, this invention provides maximum flexibility for use at unloading locations having both types of systems. Furthermore, the material unloading system of this invention can be retrofit onto other types of pressure differential railroad hopper cars than as specifically shown in FIG. 1.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A combined container and material unloading system comprising:
   a container defining an interior and including an inlet and an outlet;
   a product outlet line that communicates with said interior of said container through said outlet;
   a source of pressurized fluid that communicates with said interior of said container through said inlet and with said product outlet line;
   a source of vacuum that communicates with said product outlet line; and
   a venturi valve assembly that provides communication between said source of vacuum and said product outlet line, said venturi valve assembly including a venturi pipe and a check valve that provides one-way communication from said venturi pipe to said product outlet line.

2. The combined container and material unloading system defined in claim 1 further including an inlet valve assembly that provides communication between said source of pressurized fluid and said container.

3. The combined container and material unloading system defined in claim 2 wherein said inlet valve assembly includes a check valve that provides one-way communication from said source of pressurized air to said container.

4. The combined container and material unloading system defined in claim 3 wherein said inlet valve assembly further includes pressure reducing valve connected between a check valve and said container.

5. The combined container and material unloading system defined in claim 1 further including a fluid inlet and a check valve that provides one-way communication from said fluid inlet to said product outlet line.

6. The combined container and material unloading system defined in claim 1 wherein said source of vacuum is operable independently of said source of pressurized fluid.

* * * * *